United States Patent [19]

Boyd et al.

[11] Patent Number: 6,166,831
[45] Date of Patent: Dec. 26, 2000

[54] SPATIALLY OFFSET, ROW INTERPOLATED IMAGE SENSOR

[75] Inventors: Stuart D. J. Boyd, Hamilton; Dahong Qian, Westford, both of Mass.

[73] Assignee: Analog Devices, Inc., Norwood, Mass.

[21] Appl. No.: 08/991,593

[22] Filed: Dec. 15, 1997

[51] Int. Cl.[7] .................................................. H04N 1/04
[52] U.S. Cl. ........................ 358/483; 348/308; 348/275
[58] Field of Search ................................. 358/482, 483, 358/445, 474, 514; 382/312; 250/208.1; 348/364, 275, 307–309

[56] References Cited

U.S. PATENT DOCUMENTS

| | | | |
|---|---|---|---|
| 4,558,365 | 12/1985 | Ochi | 358/275 |
| 5,262,871 | 11/1993 | Wilder et al. | 348/307 |
| 5,264,694 | 11/1993 | Diehl et al. | 250/208.1 |
| 5,285,295 | 2/1994 | Kai et al. . | |
| 5,309,240 | 5/1994 | Miwada . | |
| 5,345,319 | 9/1994 | Yu . | |
| 5,426,290 | 6/1995 | Kawamoto . | |
| 5,485,202 | 1/1996 | Ueda . | |
| 5,485,203 | 1/1996 | Nakamura et al. . | |
| 5,485,204 | 1/1996 | Taniji . | |
| 5,485,205 | 1/1996 | Miyata . | |
| 5,485,207 | 1/1996 | Nam . | |
| 5,488,239 | 1/1996 | Jung . | |
| 5,521,636 | 5/1996 | Nakayama et al. . | |
| 5,614,825 | 3/1997 | Maxfield et al. | 324/242 |
| 5,751,444 | 5/1998 | Ward | 358/474 |

OTHER PUBLICATIONS

Schanz et al., "A CMOS Linear Image Sensor Array With On–Chip Programmable Signal Processing", 21st European Solid State Circuits Conference 1995.
Kojima et al., "A 5k–Pixel CCD Linear Image Sensor With Adjacent RGB Photodiode Rows", IEEE Solid State Circuits Conference, 1885 (pp. 224–225.).
Selection Guide, Panasonic CCD Image Sensor Family, (1996, 1997).

Primary Examiner—Cheukfan Lee
Attorney, Agent, or Firm—Iandiorio & Teska

[57] ABSTRACT

Spatially offset, row interpolated image sensor includes a linear array sensor having a first row of longitudinally extending pixels with a first spatial periodicity and a second row of longitudinally extending pixels having a second spatial periodicity laterally adjacent the first row and longitudinally staggered with respect to the first row; and a read circuit for individually, selectively sampling pixels of the rows for producing a composite output which has a combined spatial periodicity which is shorter than either of the first and second spatial periodicities and has a number of samples equal to the combined samples of both the rows.

6 Claims, 4 Drawing Sheets

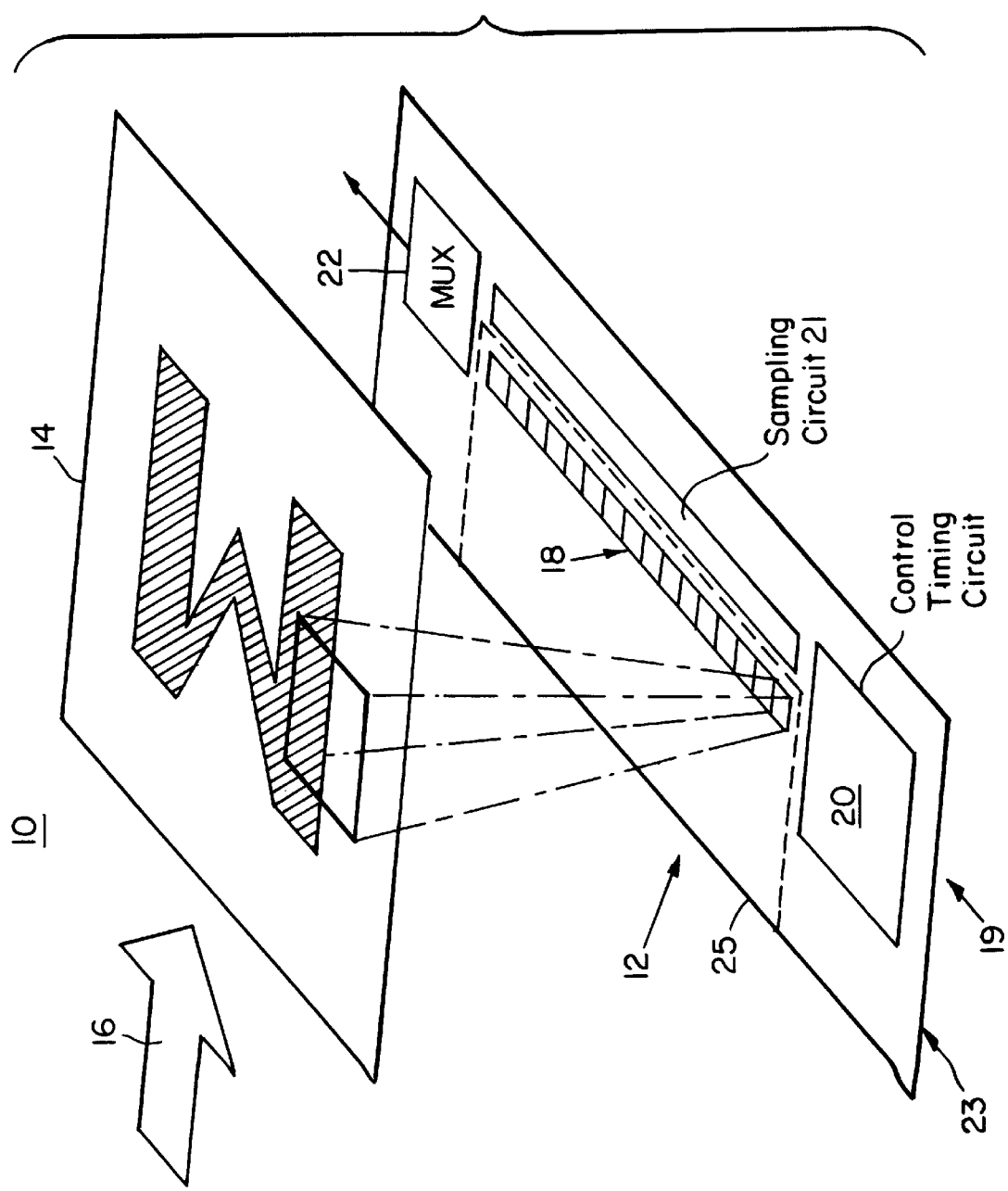

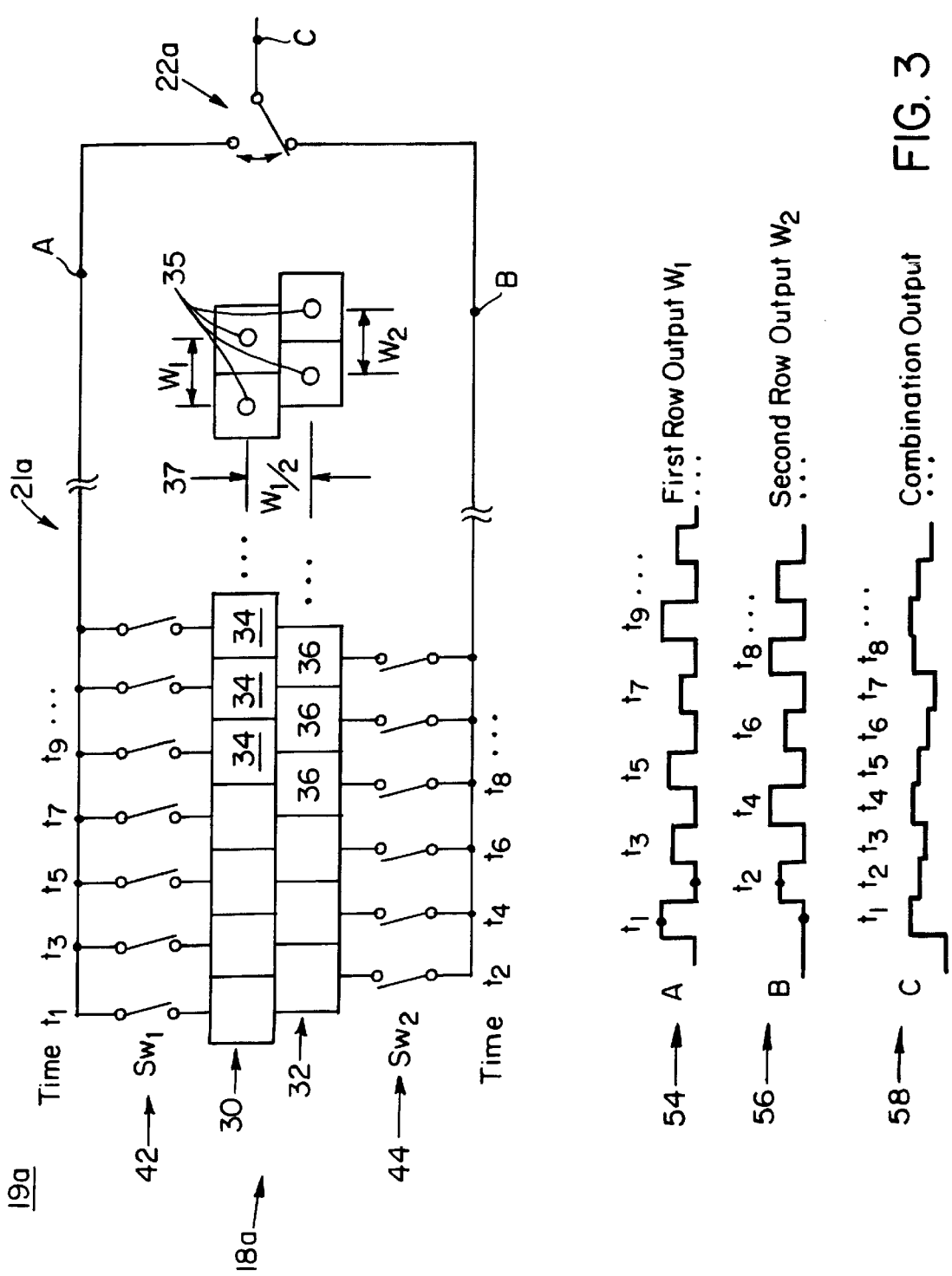

SPATIALLY OFFSET, ROW INTERPOLATED IMAGE SENSOR

FIELD OF INVENTION

This invention relates to a spatially offset, row interpolated image sensor.

BACKGROUND OF INVENTION

In conventional line scanners an input page, for example, is read line by line. Each line scanned is collected by a lens and projected into a linear array typically a CCD. The linear array is much smaller than the line, typically 1.0–2.5 inches for a scan line of 8.5 inches. Resolution, an important aspect of any scanner, depends on the number of pixels in the linear array and this in turn depends on the size of the pixels. There is a practical limit to pixel size. In order to improve resolution the pixels are made smaller and smaller. But at some point the pixels become so small that their light collecting ability suffers. The output signal is too small. The pixel size limit is presently believed to be approximately $5\mu$. The other approach to improve resolution, having reached the minimum pixel size, is to increase the number of pixels by increasing the length of the linear array. Increasing the length of the array enlarges the size of the final component and increases the cost of both the component and the overall system. In present CCD implementations the CCD pixels are not readily compatible with on-chip peripheral circuitry and CCD arrays must be read out sequentially in their entirety.

SUMMARY OF INVENTION

It is therefore an object of this invention to provide an improved linear array image sensor.

It is a further object of this invention to provide such a linear array image sensor with higher resolution.

It is a further object of this invention to provide such a linear array image sensor which is lower in cost.

It is a further object of this invention to provide such a linear array image sensor which doubles the resolution without increasing the length of the array or reducing the pixel size.

It is a further object of this invention to provide such a linear array image sensor which increases resolution without sacrificing light collection ability or increasing system cost.

It is a further object of this invention to provide such a linear array image sensor which is implementable in CMOS making it more compatible with on-chip peripheral circuitry.

It is a further object of this invention to provide such a linear array image sensor which unlike conventional CCD implemented linear arrays can have its pixels read out individually, selectively.

It is a further object of this invention to provide such a linear array image sensor in which lower resolution images can be read out in much less time.

The invention results from the realization that a spatially offset, row interpolated image sensor capable of much higher resolution without increasing the length of the linear array can be effected by arranging the pixels of the array in at least two adjacent longitudinal rows with the pixels in each row staggered longitudinally with respect to those in the adjacent row and sampling pixels from each row so the apparent periodicity is shorter than the periodicities of any of the individual rows resulting in the output of the linear array having a total number of samples equal to that of all the rows combined.

This invention features as partially offset, row interpolated image sensor. There is a linear array sensor including a first row of longitudinally extending pixels having a first spatial periodicity and a second row of longitudinally extending pixels having a second spatial periodicity laterally adjacent the first row and longitudinally staggered with respect to the first row. A read circuit individually, selectively samples the pixels of the rows and produces a composite output which has a combined spatial periodicity which is shorter than either of the first and second spatial periodicities and has a number of samples equal to the combined samples of both the rows.

In a preferred embodiment the first and second periodicities may be the same. The rows of pixels may be offset laterally by approximately one half the first periodicity. The linear array sensor and the read circuit may be on the same chip. The linear array sensor and the read circuit may be CMOS implemented. The read circuit may sample the pixels of the first row interleaved with those of the second row.

DISCLOSURE OF PREFERRED EMBODIMENT

Other objects, features and advantages will occur to those skilled in the art from the following description of a preferred embodiment and the accompanying drawings, in which:

FIG. 1 is a schematic diagram of a line scanner employing the spatially offset, row interpolated image sensor according to this invention;

FIG. 2 is a schematic diagram showing in greater detail the image sensor of FIG. 1;

FIG. 3 illustrates a number of signals occurring in the operation of the image sensor of FIG. 2;

Figure 4:
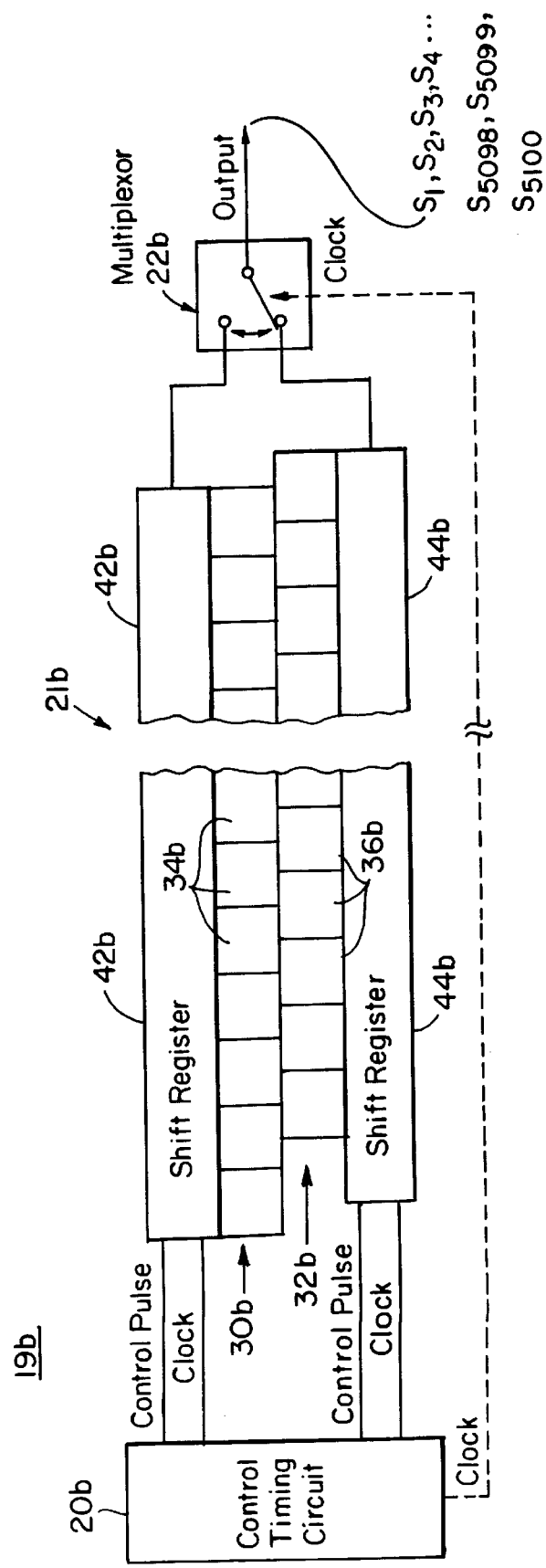
FIG. 4 is a more detailed illustration of the read circuit of FIG. 2.

There is shown in FIG. 1 a schematic diagram of a portion of a scanner 10 employing the spatially offset, row interpolated image sensor 12 according to this invention. The object or paper being scanned 14 is moved relative to the image sensor 12. Here it is the paper 14 that is being moved in the direction of arrow 16. Image sensor 12 includes the linear array 18 and the read circuit 19 which includes control timing circuit 20, sampling circuit 21 and MUX 22. All three components of read circuit 19 may be on the same chip which may be a CMOS chip 23 and may be integral with chip 25 containing linear array 18. The image is projected from the page or paper 14 to the linear array 18 which is managed by control timing circuit 20 to provide an output through MUX 22 a line at a time as paper 14 and linear array 18 are moved relative to each other.

Linear array 18, FIG. 2, includes first and second rows 30, 32 which are adjacent to each other and formed of a plurality of longitudinally extending pixels 34, 36. Typically pixels 34 in row 30 have a spatial periodicity or pitch $W_1$. Pixels 36 in row 32 have a periodicity or pitch of $W_2$. Typically the pitch is equivalent to the width of the pixels. For example, with a high resolution system employing eight micron wide pixels, $W_1$ would be 8 microns. Typically, but not necessarily, $W_2$ is equal to $W_1$ so it too could have a pitch of 8 microns. It is noted that fabrication tolerances in manufacturing scanner 10 result in variations of the lateral separation of the pixels. The position of centroids of sensitivity 35 of pixels 34 and 36 in rows 30 and 32 can vary laterally as much as one half of the periodicity or pitch $W_1$ of the cells in the longitudinal direction as indicated by the $W_1/2$ dimension 37. Thus if the lateral spacing can be kept within that range, the two rows effectively function as one row. Yet because the two rows are staggered with respect to each other they can be sampled so that they provide a periodicity which is shorter than either $W_1$ or $W_2$. If $W_1$ and $W_2$ are equal then the periodicity overall of the combined rows 30 and 32 can be as little as $W_1/2$. Thus while the overall length of linear array 18 typically provides a resolution afforded by the periodicity $W_1$, with this invention the same length row can provide a resolution of twice that, a resolution normally associated with a linear sensor twice as long. Read circuit 20 includes a first plurality of switches 42, the odd switches which read out pixels 34 in row 30 at times $t_1, t_3, t_5, t_7, t_9 \ldots$ Second switch circuit 44 reads out pixels 36 in row 32 at even times $t_2, t_4, t_6, t_8 \ldots$ Typically but not necessarily, the switches can be read out alternately odd and even: first $t_1$, then $t_2$, then $t_3$, then $t_4$, then $t_5 \ldots$ If switch 22a then operated synchronously with switches 42 and 44, a single line of interleaved outputs from pixels 34 and 36 can be obtained whereby the signal is a combined series of pixels alternating from rows 30 and 32, at times $t_1, t_2, t_3, t_4, t_5. \ldots$ In operation, switch control signal 50 operates alternately with switch control signal 52 to control switches 42 and 44. This results in the output at point A from the first row 42 appearing as at 54, FIG. 3, and the output at point D from second row 44 appearing as at 56. The amplitudes of the signals 54 and 56 differ since the amount of incident light on each pixel may differ. The phase of signals 54 and 56, however, are shown as being at 180° since there are but two rows 30 and 32 and they are oppositely phased. The combined output then, with the pixels of the two rows 30, 32 interleaved, appears at C as shown by signal 58 where the two signals A and B are interleaved so that the final signal has a length of both the outputs A and B combined with a periodicity that is one half of either and provides a resolution of, for example, 600 dpi. An added advantage of this invention is that if a lower resolution is acceptable, e.g., 300 dpi, the system can be made to read out only one row in half the time, or for 200 dpi in a third of the time. This is so because the system can be implemented in CMOS which permits individual selection of pixels unlike CCD implementation.

In one embodiment switches 42 and 44 are replaced by shift registers 42b and 44b associated with rows 30b and 32b, respectively, of linear array sensor 18b, FIG. 4. Control timing circuit 20b provides a control pulse and a clock pulse to each of shift registers 42b and 44b. In each case the control pulse selects the stage of the shift register or the particular pixel 34b, 36b which is to be sampled, and then the sample is actually taken upon the occurrence of the clock signal. In this way the contents of the pixels 34b, 36b may be sampled and read out in any order: all the pixels in row 30b, then all the pixels in row 32b, or one from each row, or two from each row, or two from one and one from the other, whatever is desired. Once the output from a particular cell has been collected and clocked out, multiplexer 22b is synchronized by the clock pulse from control timing circuit 20b to select the output of the appropriate register 42b, 44b from which to receive that sample and provide the output.

Figure 5:
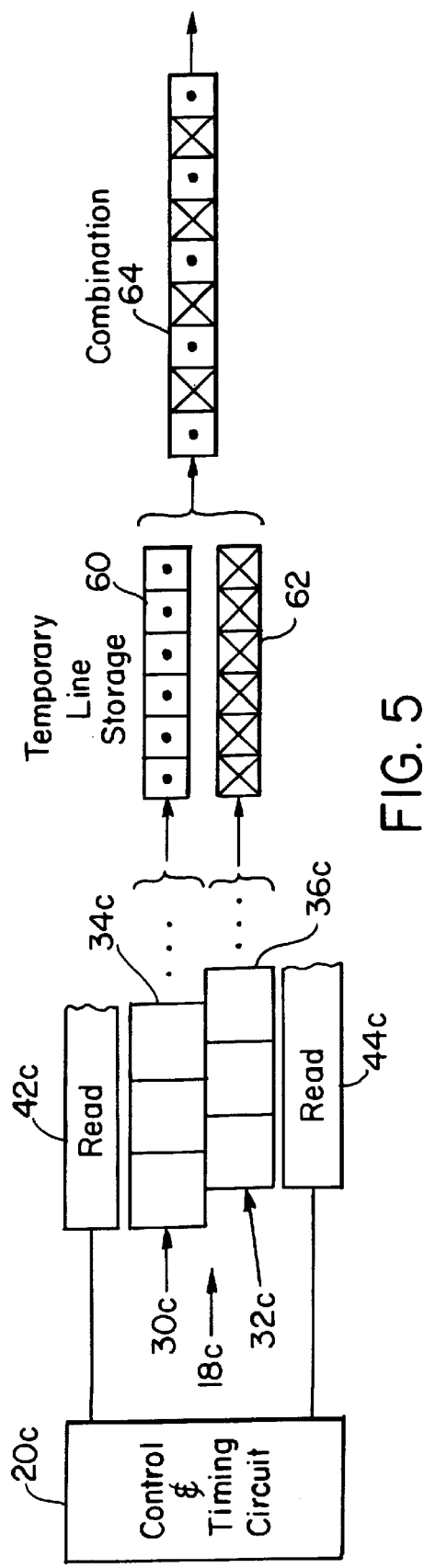
FIG. 5 is a schematic diagram illustrating an alternative arrangement for sampling and combining pixels from different rows.

Although the representations in FIGS. 1–4 illustrate a sampling which is interleaved between the two rows and a sampling which takes place directly from the pixels in each row, these are not necessary limitations of the invention. For example, as shown in FIG. 5, the contents of pixels 34c in row 30c may be read out serially in their entirety to a temporary line storage 60. Similarly, the contents of pixels 36c of row 32c may be read out serially in their entirety to line storage 62. After, they may be combined in any desired combination under control of a microprocessor or other control device. For example, they may be combined in the heretofore explained interleaved one by one combination as shown at 64, or they may be combined in any other desired form.

Figure 6:
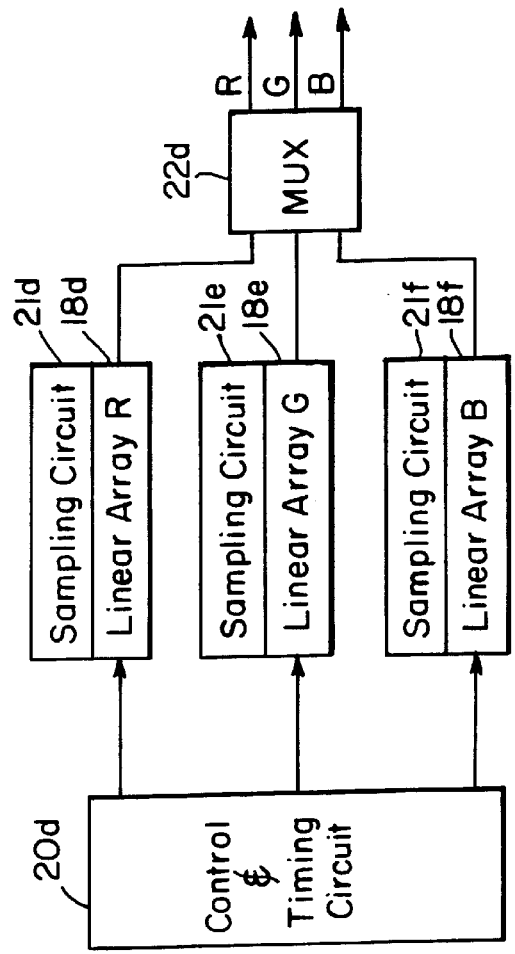
FIG. 6 is a block diagram showing the image sensor of this invention in a three color application.

Although the invention has been explained in terms of a single linear array sensor, more typically three such devices are used in color systems, one for red, one for green and one for blue. In such a case, three linear arrays 18d, 18e, 18f, FIG. 6, associated with sampling circuits 21d, 21e, 21f are operated by control timing circuit 20d to provide the multiplexed outputs to MUX 22d which multiplexes not two but six signals to provide the red, green and blue signals in accordance with the spatially offset row interpolated image sensor according to this invention.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A spatially offset, row interpolated image sensor comprising: a linear array sensor including a first row of longitudinally extending pixels having a first spatial periodicity and a second row of longitudinally extending pixels having a second spatial periodicity laterally adjacent said first row and longitudinally staggered with respect to the first row, where at least one pixel of said first row overlaps at least one pixel of said second row; and a read circuit for individually, selectively sampling pixels of said rows for producing a composite output which has a combined spatial periodicity, which is shorter than either of the first and second spatial periodicities and has a number of samples equal to the combined samples of both rows.

2. The spatially offset, row interpolated image sensor of claim 1 in which the first and second periodicities are the same.

3. The spatially offset, row interpolated image sensor of claim 1 in which the first and second rows of pixels are offset laterally by approximately one half the first periodicity.

4. The spatially offset, row interpolated image sensor of claim 1 in which said linear array sensor and said read circuit are on the same chip.

5. The spatially offset, row interpolated image sensor of claim 1 in which said linear array sensor and said read circuit are CMOS implemented.

6. The spatially offset, row interpolated image sensor of claim 1 in which said read circuit samples the pixels of the first row interleaved with those of the second row.

* * * * *